(12) United States Patent
Inagaki

(10) Patent No.: US 6,847,473 B2
(45) Date of Patent: Jan. 25, 2005

(54) LASER SCANNING APPARATUS

(75) Inventor: Yoshihiro Inagaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/397,263

(22) Filed: Mar. 27, 2003

(65) Prior Publication Data

US 2003/0184834 A1 Oct. 2, 2003

(30) Foreign Application Priority Data

Mar. 27, 2002 (JP) ........................................ 2002-088516

(51) Int. Cl.$^7$ ............................................. G02B 26/08
(52) U.S. Cl. ..................................................... 359/205
(58) Field of Search ................................ 359/205, 206, 359/207, 208, 216

(56) References Cited

U.S. PATENT DOCUMENTS 4,852,957 A   8/1989  Wakimoto et al.
5,963,355 A * 10/1999  Iizuka ........................ 359/205

FOREIGN PATENT DOCUMENTS

JP          11-153764 A     6/1999

* cited by examiner

*Primary Examiner*—Euncha P. Cherry
(74) *Attorney, Agent, or Firm*—Burns, Doane, Swecker & Mathis, L.L.P.

(57) ABSTRACT

A laser scanning apparatus permits laser light to converge satisfactorily all over a scanned region despite having a post-deflector optical system composed of a comparatively small number of optical elements. The post-deflector optical system has a transmissive and a reflective surface, each a free-form surface, and the laser light coming from a deflector and transmitted through the transmissive surface is reflected from the reflective surface so as to be transmitted through the transmissive surface again. The laser light is made incident on the reflective surface obliquely with respect to the sub scanning direction so that, when the laser light is transmitted through the transmissive surface for the first and second times, it is incident thereon in different areas thereon in the sub scanning direction. The transmissive and reflective surfaces may be formed on a single optical element.

11 Claims, 12 Drawing Sheets

40

LASER SCANNING APPARATUS

This application is based on Japanese Patent Application No. 2002-88516 filed on Mar. 27, 2002, the contents of which are hereby incorporated by reference.

BACKGROUND OF THE INVENTION

1. Field of the Invention

The present invention relates to a laser scanning apparatus that finds application in fields involving image formation.

2. Description of the Prior Art

Image forming apparatuses such as printers and copiers incorporate a laser scanning apparatus that forms a latent image of an object image on a photoconductive member by scanning the photoconductive member with laser light that converges thereon. A laser scanning apparatus is composed of a laser light source that emits laser light, a deflector that deflects the laser light from the laser light source in a main scanning direction in which to scan the photoconductive member, and an optical system that makes the laser light converge on the photoconductive member. The optical system for making the laser light converge on the photoconductive member is typically composed of two parts, namely a pre-deflector optical system disposed between the laser light source and the deflector to control the convergence of the laser light principally in the sub scanning direction (the direction perpendicular to the main scanning direction) and a post-deflector optical system disposed between the deflector and the photoconductive member to control the convergence of the laser light in both the main and sub scanning direction.

The post-deflector optical system needs to be designed to permit the laser light to form an extremely small spot at every position at which it is incident on the photoconductive member (i.e., all over the scanned region) despite the fact that the optical path length to the photoconductive member and the angle of incidence with respect to the photoconductive member vary according to the position at which the laser light is incident on the photoconductive member. Thus, building the post-deflector optical system by using common spherical optical elements tends to result in making it unduly complicated and large.

To overcome this, proposals have been made to reduce the number of needed optical elements by using aspherical or free-form-surfaced optical elements. For example, Japanese Patent Application Laid-Open No. H11-153764 proposes a construction in which a post-deflector optical system is provided with a free-form-surfaced mirror so that laser light is made to converge by that free-form-surfaced mirror alone. This helps simplify and miniaturize the construction.

However, even when a free-form-surfaced optical element is used, there is a limit to its aberration correction performance. Thus, it is difficult to achieve satisfactory convergence of laser light all over a scanned region by the use of a single free-form-surfaced mirror. The shape of the laser light spot tends to be deformed particularly at both ends of the scanned region, leading to poor image quality in peripheral portions of the formed image.

SUMMARY OF THE INVENTION

An object of the present invention is to provide a laser scanning apparatus that permits laser light to converge satisfactorily all over a scanned region despite having a simple construction with a post-deflector optical system composed of a comparatively small number of optical elements.

To achieve the above object, according to one aspect of the present invention, a laser scanning apparatus is provided with: a laser light source; a deflector for deflecting the laser light from the laser light source in a predetermined direction; and a scanning optical system for directing the laser light from the deflector to a predetermined scanned region so as to make the laser light converge on the scanned region. Here, the scanning optical system includes a first nonflat surface that transmits the laser light from the deflector and a second nonflat surface that reflects the laser light transmitted through the first surface toward the first surface. The second surface has no symmetry plane. When the deflector deflects the laser light at least at such an angle of deflection that the laser light is incident at the center of the scanned region, the laser light transmitted through the first surface is incident on the second surface obliquely with respect to the direction perpendicular to the direction in which the deflector deflects the laser light.

In this laser scanning apparatus, the scanning optical system includes a first surface, which is a transmissive surface, and a second surface, which is a reflective surface. The laser light from the deflector is transmitted through the first surface, and is then reflected from the second surface so as to be transmitted through the first surface gain. The first and second surfaces are both nonflat surfaces having optical powers, and their optical powers make the laser light converge on the scanned region. Moreover, the second surface is a free-form surface having no symmetry plane, and can therefore control the convergence of the laser light both in the main scanning direction and in the sub scanning direction wherever in the scanned region the laser light is incident.

Furthermore, the laser light transmitted through the first surface is incident on the second surface obliquely with respect to the sub scanning direction, and is therefore reflected in a direction different from the direction of incidence. Thus, when the laser light is transmitted through the first surface for the first and second times, it is incident thereon in different areas thereon in the sub scanning direction. These different areas on the first surface may be given different optical powers to more finely control the convergence of the laser light. Moreover, it is possible to separate the optical path of the laser light traveling from the deflector to the first surface from the optical path of the laser light traveling from the second surface after being transmitted through the first surface. This makes it easy to set the positional relationship between the deflector and the scanned region.

The range of angles of deflection with which the laser light transmitted through the first surface is incident on the second surface obliquely with respect to the sub scanning direction may be a range that corresponds to the whole scanned region or a range that corresponds to part of the scanned region other than its end portions. This is because, on the first surface, the area in which the laser light from the second surface is incident is wider in the main scanning direction than the area in which the laser light from the deflector is incident, and therefore the laser light that is going to be incident in the end portions of the scanned region, even when it is incident on the second surface perpendicularly with respect to the sub scanning direction, produces no overlap on the first surface.

The first surface may be so formed that the area thereon in which the laser light from the deflector is incident does not overlap the area thereon in which the laser light from the second surface is incident. This makes it possible to treat the laser light differently when it is transmitted through the first surface for the first and second times to more finely control its convergence. Moreover, it is then easier to separate the optical paths.

The first surface may be so formed as to have no symmetry plane. This permits not only the second surface but also the first surface to control the convergence of the laser light in both the main and sub scanning directions. Thus, it is possible to make the laser light converge more satisfactorily all over the scanned region.

The first surface may be so formed that, in a portion thereof between the area thereon in which the laser light from the deflector is incident and the area thereon in which the laser light from the second surface is incident, the first surface has discontinuous surface inclinations with respect to the direction perpendicular to the direction in which the deflector deflects the laser light. This makes it possible to design thoroughly independently the area on the first surface in which the laser light from the deflector is incident and the area thereon in which the laser light from the second surface is incident, and thus makes it extremely easy to finely control the convergence of the laser light.

The first and second surfaces may be formed on separate optical elements or on a single optical element. Forming the first and second surfaces on a single optical element makes it possible to build the scanning optical system with only one optical element, and thereby realize an extremely simple optical system. In this case, the optical element acts as a back-surface-reflection mirror that lets light in through its front surface (the first surface) and then reflects the light inward on its back surface (the second surface).

According to another aspect of the present invention, a laser scanning apparatus is provided with: a laser light source; a deflector for deflecting the laser light from the laser light source in a predetermined direction; and an optical element having a first nonflat surface that transmits the laser light from the deflector and a second nonflat surface that has no symmetry plane and that reflects the laser light transmitted through the first surface toward the first surface.

According to another aspect of the present invention, a laser scanning apparatus is provided with: a laser light source; a deflector for deflecting the laser light from the laser light source in a predetermined direction; and a scanning optical system for directing the laser light from the deflector to a predetermined scanned region so as to make the laser light converge on the scanned region. Here, the scanning optical system includes an optical element having a first nonflat surface that transmits the laser light from the deflector and a second nonflat surface that has no symmetry plane and that reflects the laser light transmitted through the first surface toward the first surface.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
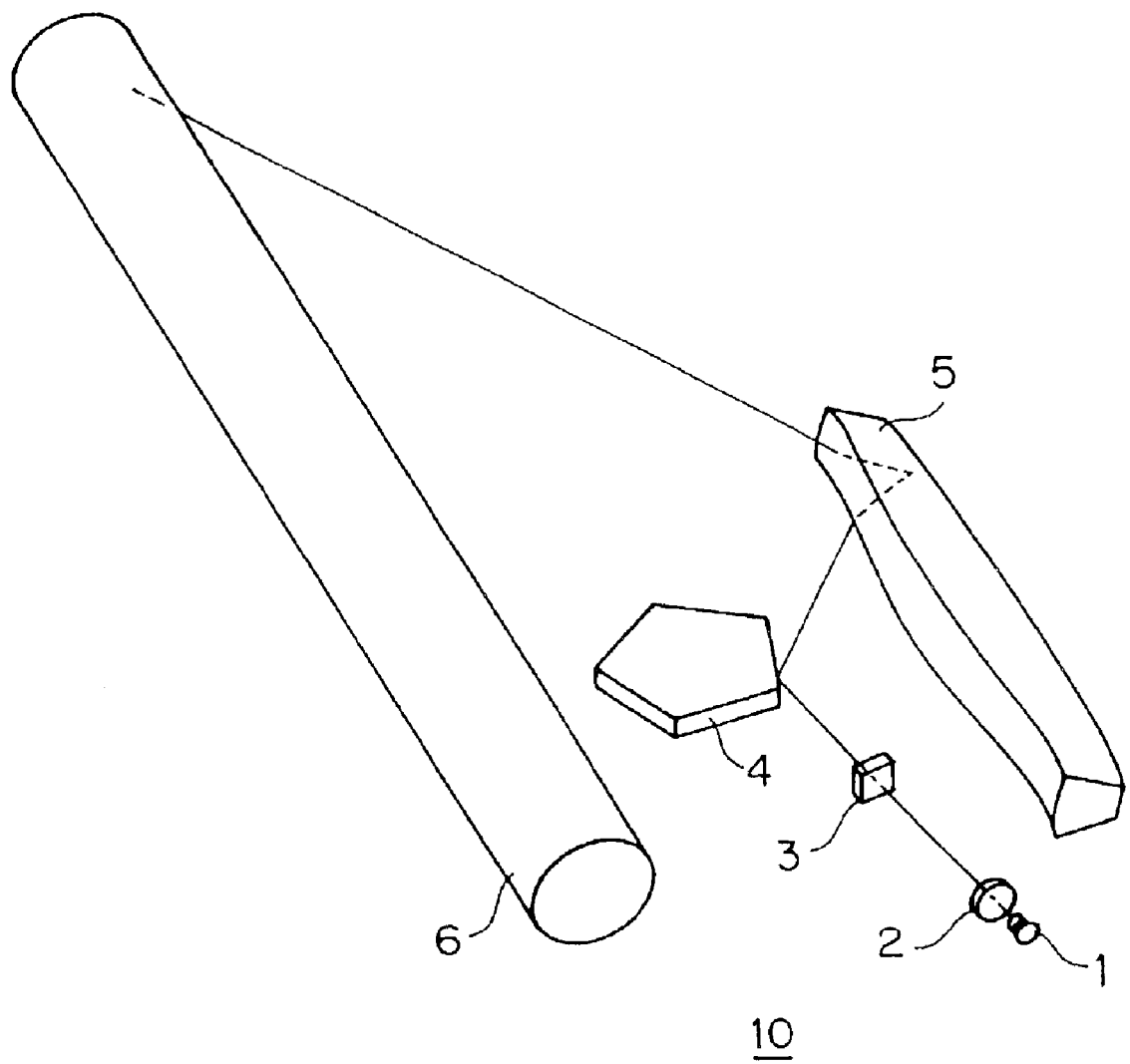
FIG. 1 is a perspective view showing the optical construction of the laser scanning apparatus of a first embodiment of the invention.

Hereinafter, laser scanning apparatuses embodying the present invention will be described with reference to the drawings. FIG. 1 shows the optical construction of the laser scanning apparatus 10 of a first embodiment of the invention. The laser scanning apparatus 10 is composed of a laser light source 1, a collimator lens 2, a cylinder lens 3, a polygon mirror 4, and a back-surface-reflection mirror 5.

The laser light emitted from the laser light source 1 is first formed into a parallel beam by the collimator lens 2, and is then formed, by the cylinder lens 3, into a convergent beam that converges in the vicinity of the reflective surface of the polygon mirror 4 only in the sub scanning direction. The laser light is then deflected by the polygon mirror 4 so as to travel through the back-surface-reflection mirror 5 and reach a rectilinear scanned region. Meanwhile, the laser light is formed into a convergent beam that converges on the scanned region in both the main and sub scanning directions so as to form an extremely small spot on the scanned region. A photoconductive member 6 is disposed with its photoconductive surface located on the scanned region so that, as the laser light scans the scanned region, an image is formed on the photoconductive member 6.

The laser scanning apparatus 10 has, as a scanning optical system for making the laser light from the polygon mirror 4, which serves as a deflector, converge on the scanned region, only the back-surface-reflection mirror. The whole post-deflector optical system, too, is composed of the back-surface-reflection mirror 5 alone.

Tables 1 to 3 show the construction data of the post-deflector optical system. All lengths are given in mm. In the tables, each value including the letter "E" has a mantissa on the left of "E" and an exponent of 10 on the right thereof In Table 1, used as the evaluation plane is the plane that includes the scanned region and that is parallel to the sub scanning direction. The back-surface-reflection mirror 5 is made of resin, and has a refractive index of 1.51882. The shape of a surface is given by formula (1) below. The main scanning direction is referred to as "y," the sub scanning direction as "z," and the direction perpendicular to both the main and sub scanning directions as "x."

$$x = \sum_{i=0}^{10} \sum_{j=0}^{8} a_{ij} \cdot y^i \cdot z^j \quad (1)$$

Figure 2:
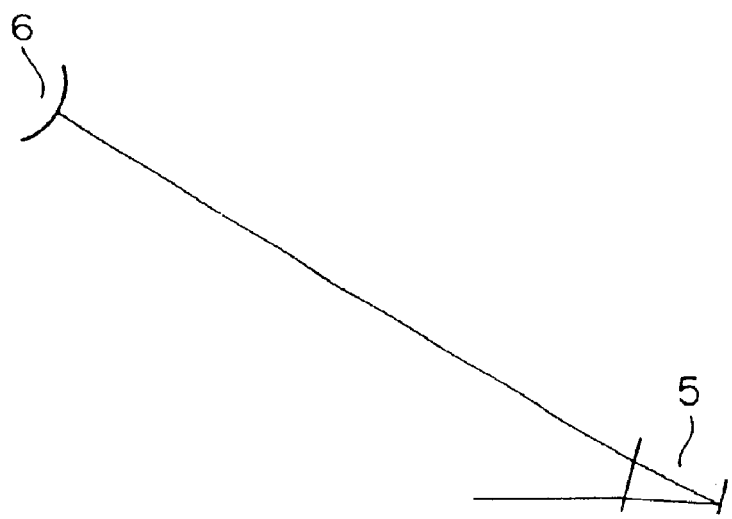
FIG. 2 is a sectional view taken along the sub scanning direction, showing the shape of the optical surface of the post-deflector optical system and how the laser light travels when deflected at an angle of deflection of 0° in the laser scanning apparatus of the first embodiment.

FIG. 2 shows the shape of the optical surface of the post-deflector optical system on a section thereof (y=0) along the sub scanning direction and how the laser light travels when deflected at an angle of deflection of 0°. It is to be noted that the laser light is represented by its principal ray. It is also to be noted that, when deflected at an angle of deflection of 0°, the laser light is incident at the center of the scanned region in the main scanning direction.

The back-surface-reflection mirror 5 is disposed in such a way that its front surface (the first surface) through which it transmits the laser light, faces the polygon mirror 4. The laser light that has entered the back-surface-reflection mirror 5 is then reflected from its back surface (the second surface) opposite to the first surface, so as to be directed back to the first surface, through which the laser light has already passed once, and transmitted therethrough again. In the following descriptions, the first surface of the back-surface-reflection mirror 5 through which the laser light is transmitted is referred to as the transmissive surface also, and the second surface thereof from which the laser light is reflected is referred to as the reflective surface also. Both the transmissive and reflective surfaces have optical powers.

As will be understood from FIG. 2, when deflected at an angle of deflection of 0°, the laser light is incident on the reflective surface obliquely (at an angle of incidence not equal to 0°) with respect to the sub scanning direction. Thus, the reflective surface reflects the laser light in a direction different from the direction of its incidence with respect to the sub scanning direction. Accordingly, the laser light reflected from the reflective surface is incident on the transmissive surface in an area thereon different, in the sub scanning direction, from the area thereon in which the laser light from the polygon mirror 4 is directly incident. Thus, the optical path of the laser light traveling from the polygon mirror 4 to the transmissive surface is separated, in the sub scanning direction, from the optical path of the laser light traveling from the reflective surface after being transmitted through the transmissive surface. This permits the laser light reflected from the reflective surface to be directed directly to the scanned region.

If the laser light is made incident on the reflective surface perpendicularly with respect to the sub scanning direction, the optical path of the laser light traveling from the polygon mirror 4 to the transmissive surface overlaps the optical path of the laser light traveling from the reflective surface after being transmitted through the transmissive surface. This necessitates disposing a beam splitter such as a half-mirror between the polygon mirror 4 and the back-surface-reflection mirror 5 to separate the optical paths. This construction, however, is undesirable because it makes the optical system unduly large, increases the costs of the apparatus, and lowers the efficiency with which the laser light from the laser light source 1 is used.

In the laser scanning apparatus 10, the provision of the back-surface-reflection mirror 5 as a scanning optical system permits an optical power derived from refraction and an optical power derived from reflection to act on the laser light. Moreover, making the laser light from the reflective surface incident in an area different from that in which the laser light from the polygon mirror 4 is incident permits the optical power derived from refraction to act twice on the laser light. As a result of the laser light being so acted upon three times in total, the laser light is made to converge satisfactorily on the scanned region wherever in the scanned region it is incident.

Figure 3:
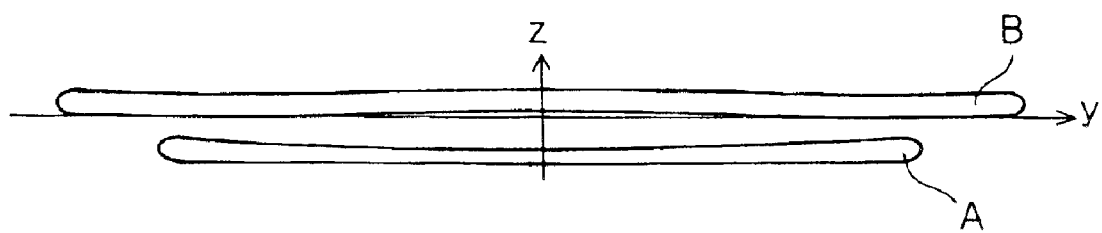
FIG. 3 is a diagram showing the areas on the transmissive surface of the back-surface-reflection mirror in which the laser light is incident in the laser scanning apparatus of the first embodiment.

FIG. 3 shows the area on the transmissive surface of the back-surface-reflection mirror 5 in which the laser light from the polygon mirror 4 is directly incident and the area thereon in which the laser light from the reflective surface is incident. In FIG. 3, "A" indicates the area in which the laser light from the polygon mirror 4 is incident, and "B" indicates the area in which the laser light from the reflective surface is incident. The areas A and B do not overlap each other, but are separate from each other. In reality, as the polygon mirror 4 rotates, the position at which the laser light is incident on the transmissive surface moves. The areas A and B shown in the figure thus correspond to the whole scanned region, i.e., the area in which image formation is performed.

By separating the areas on the transmissive surface in which the laser light is incident at different times in this way, it is possible to determine the surface shapes of the two areas independently. This permits different optical powers to act on the laser light when it is transmitted through the transmissive surface for the first and second times, and thus makes it easy to finely control the convergence of the laser light on the scanned region.

Making the laser light incident on the reflective surface of the back-surface-reflection mirror 5 obliquely with respect to the sub scanning direction may cause, in the vicinity of the plane including the scanned region (the evaluation plane), a curvature in the scanning line formed by the laser light or, due to a twist in the wavefront of the laser light incident at the ends of the scanned region, a deformation in the shape of the laser light spot. In the laser scanning apparatus 10, to prevent these inconveniences resulting from the laser light being made incident obliquely on the reflective surface, the transmissive and reflective surfaces of the back-surface-reflection mirror 5 are each formed as a free-form surfaces that is asymmetric with respect to the sub scanning direction. The fact that the transmissive and reflective surfaces of the back-surface-reflection mirror 5 are asymmetric with respect to the sub scanning direction is reflected in the fact that the indices "j" of the variable "z" shown in Tables 2 and 3 include odd numbers.

Figure 4:
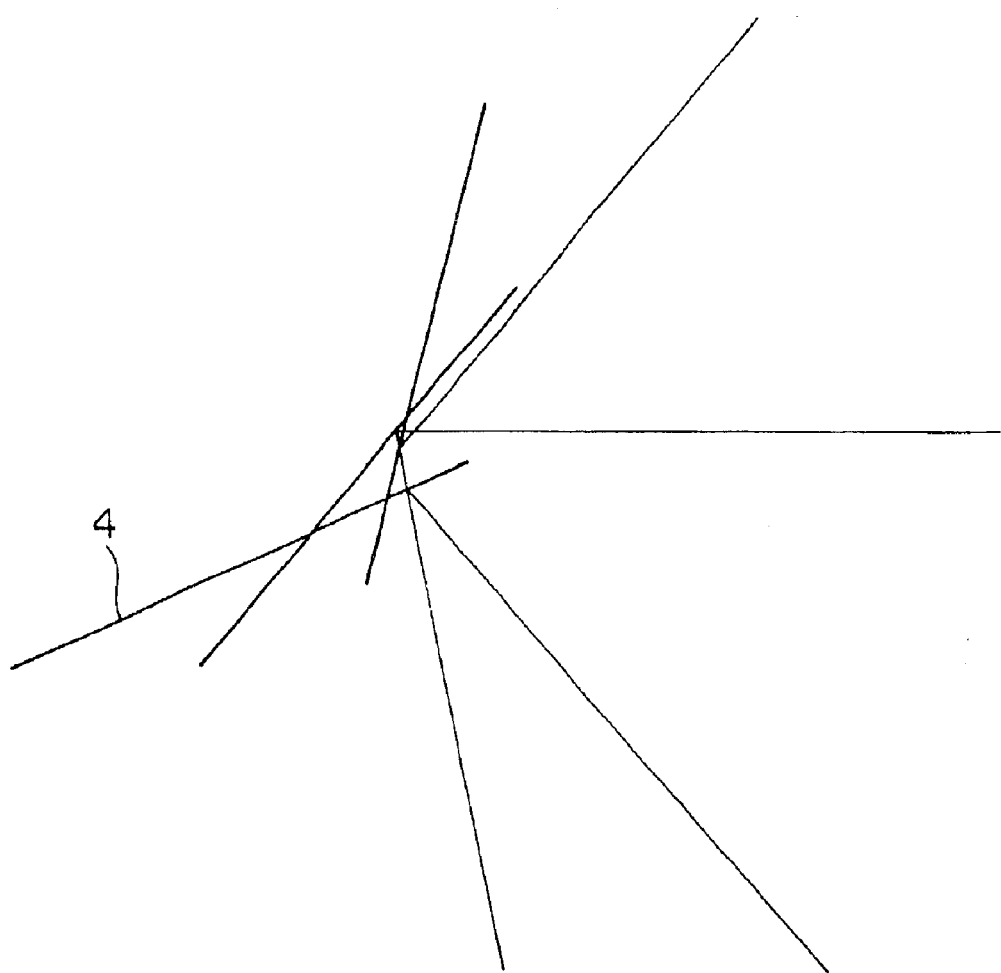
FIG. 4 is a plan view showing the laser light incident on the polygon mirror, three rays of the laser light reflected from the polygon mirror, and the positions of the reflective surface of the polygon mirror where it produces those three rays in the laser scanning apparatus of the first embodiment.

The back-surface-reflection mirror 5 is so shaped as to be asymmetric with respect to the main scanning direction also. FIG. 4 shows the laser light incident from the cylinder lens 3 on the polygon mirror 4, three rays of the laser light reflected from the polygon mirror 4, and the positions of the reflective surface of the polygon mirror 4 where it produces those three rays. FIG. 4 is a plan view on the xy plane as seen along the rotation axis of the polygon mirror 4, and the three reflected rays of the laser light are eventually incident on the scanned region at the center and both ends thereof The laser scanning apparatus 10 is so constructed that the laser light incident from the cylinder lens 3 on the polygon mirror 4 is not inclined, in the sub scanning direction, relative to the reflective surface of the polygon mirror 4 and that the pre-deflector optical system, including the components starting with the laser light source 1 and ending with the polygon mirror 4, is located outside that portion of the optical path of the laser light from the polygon mirror 4 which corresponds to the whole scanned region. This produces asymmetry with respect to the main scanning direction. To reduce aberrations in the main scanning direction resulting from this asymmetry, both the transmissive and reflective surfaces of the back-surface-reflection mirror 5 are so formed as to be asymmetric with respect to the main scanning direction.

Figure 5:
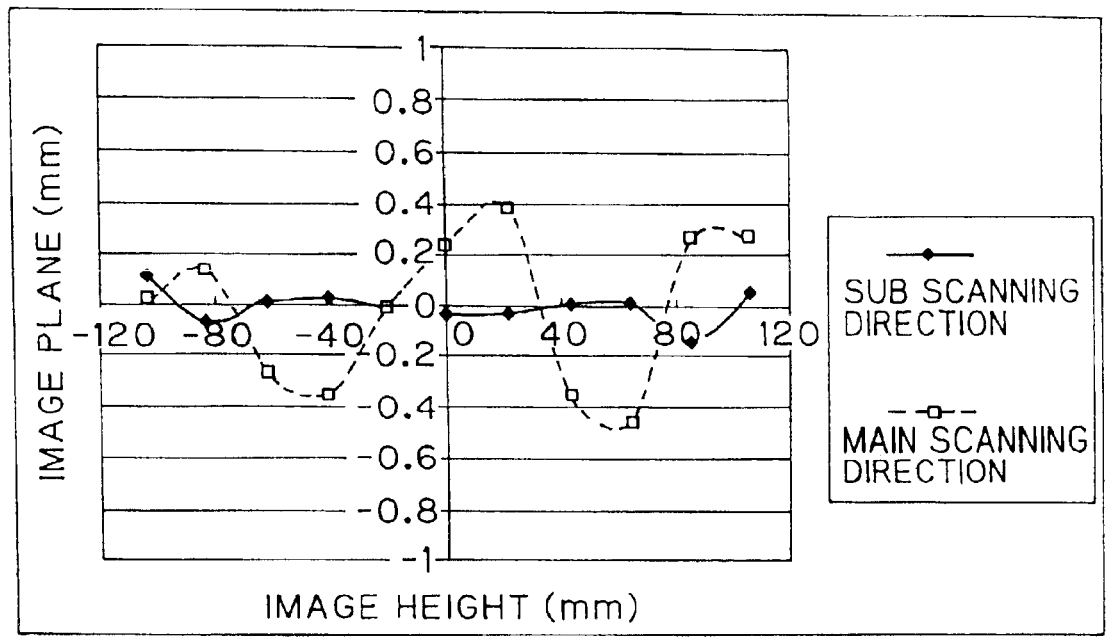
FIG. 5 is a diagram showing the curvature of field observed in the vicinity of the scanned region in the laser scanning apparatus of the first embodiment.
Figure 6:
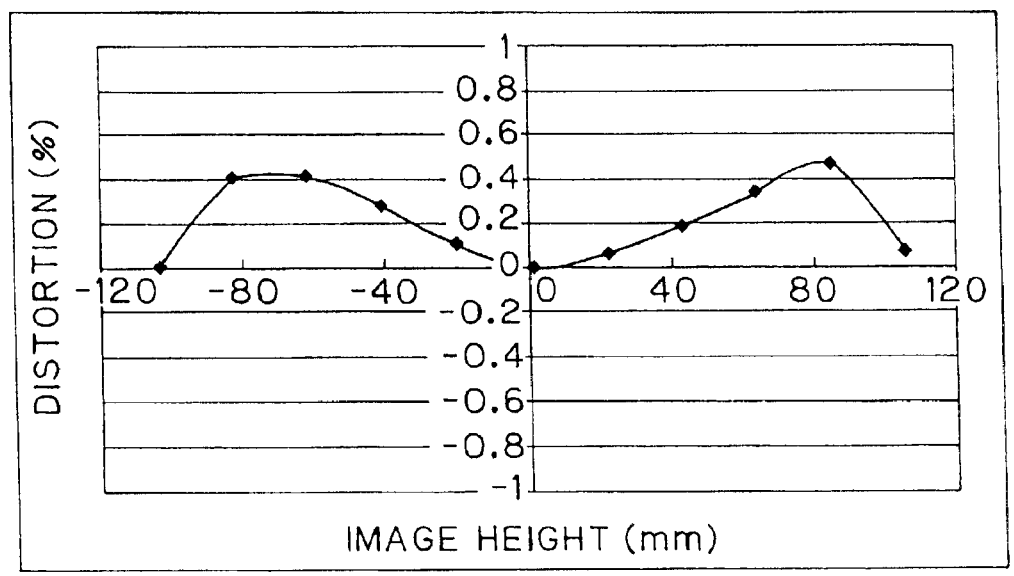
FIG. 6 is a diagram showing the distortion observed on the scanned region in the laser scanning apparatus of the first embodiment.

FIG. 5 shows the curvature of field observed in the vicinity of the scanned region, and FIG. 6 shows the distortion observed. Here, distortion is determined in comparison with an ideal condition in which the spot formed by the laser light moves with constant velocity along the scanned region as the polygon mirror 4 rotates with constant velocity.

It is to be noted that, in the following descriptions of other laser scanning apparatuses embodying the invention, such optical elements as have the same or similar functions as those used in the laser scanning apparatus 10 will be identified with the same reference numerals, and overlapping explanations will be omitted.

Figure 7:
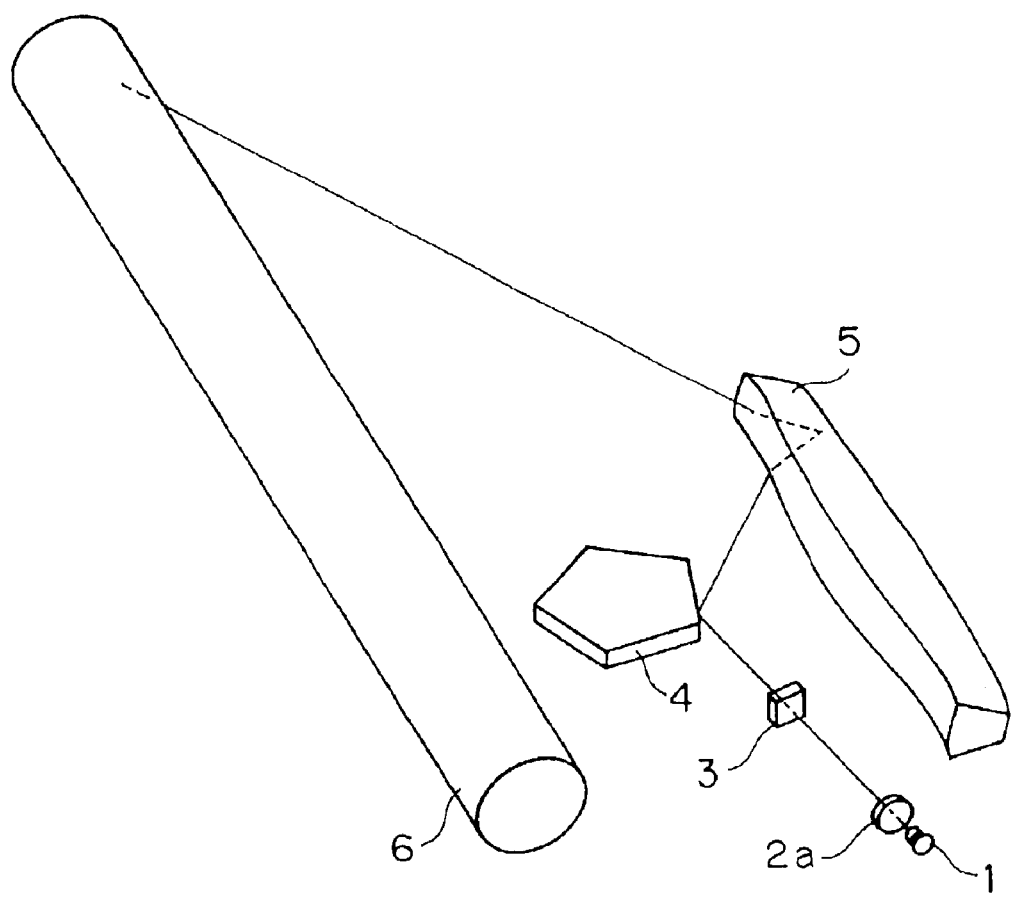
FIG. 7 is a perspective view showing the optical construction of the laser scanning apparatus of a second embodiment of the invention.

FIG. 7 shows the optical construction of the laser scanning apparatus 20 of a second embodiment of the invention. The laser scanning apparatus 20 is provided with a condenser lens 2a in place of the collimator lens 2, and does not differ greatly in construction from the laser scanning apparatus 10. The condenser lens 2a forms the laser light from the laser light source 1 into a gently divergent beam. The laser light that has passed through the condenser lens 2a, if traced backward, converges at a point at a distance of 570 mm from the polygon mirror 4. The laser light that has passed through the cylinder lens 3 converges in the vicinity of the polygon mirror 4 only in the sub scanning direction, and remains gently divergent in the main scanning direction.

Tables 4 to 6 show the construction data of the post-deflector optical system. All lengths are given in mm. The back-surface-reflection mirror 5 is made of resin, and has a refractive index of 1.51882. The shape of a surface is given by formula (1) noted earlier.

Figure 8:
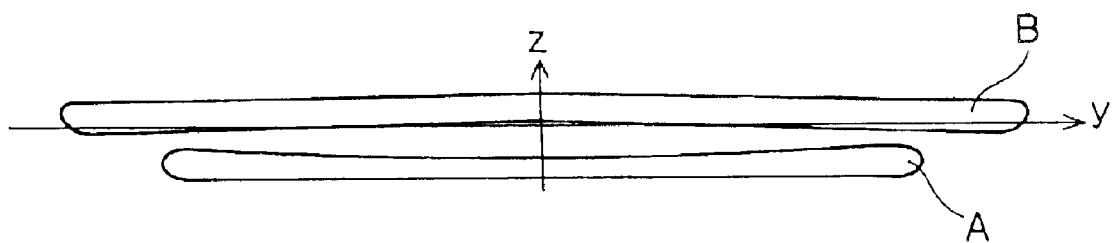
FIG. 8 is a diagram showing the areas on the transmissive surface of the back-surface-reflection mirror in which the laser light is incident in the laser scanning apparatus of the second embodiment.

FIG. 8 shows the area on the transmissive surface of the back-surface-reflection mirror 5 in which the laser light from the polygon mirror 4 is directly incident and the area thereon in which the laser light from the reflective surface is incident. In the laser scanning apparatus 20 also, the area A in which the laser light from the polygon mirror 4 is incident and the area B in which the laser light from the reflective surface is incident are separate from each other.

Figure 9:
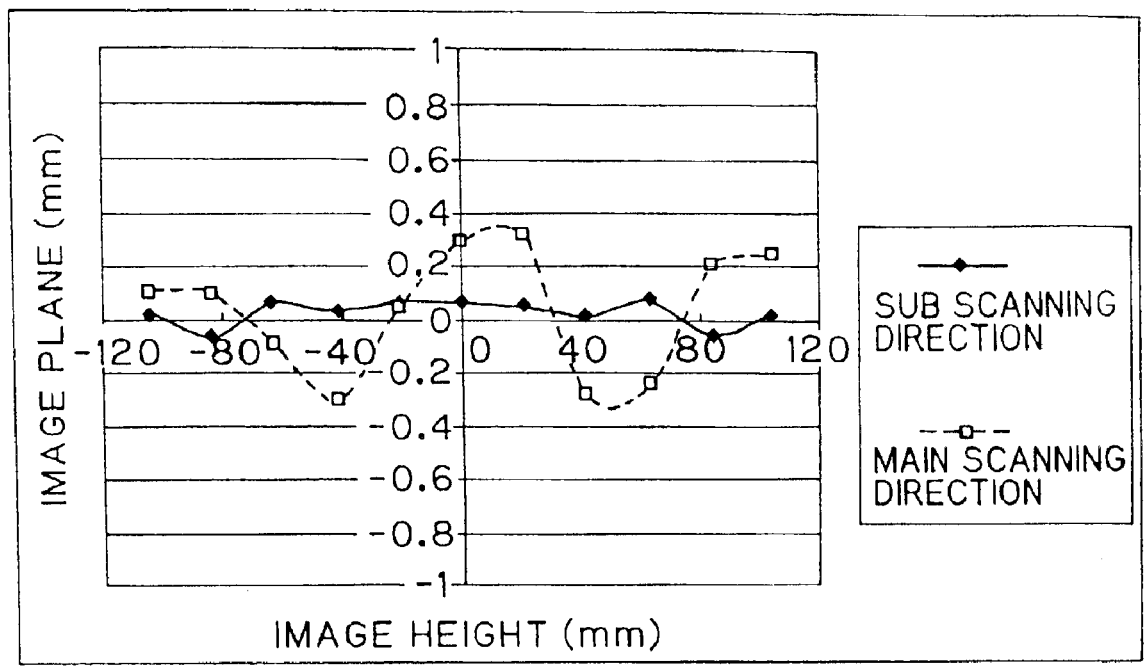
FIG. 9 is a diagram showing the curvature of field observed in the vicinity of the scanned region in the laser scanning apparatus of the second embodiment.
Figure 10:
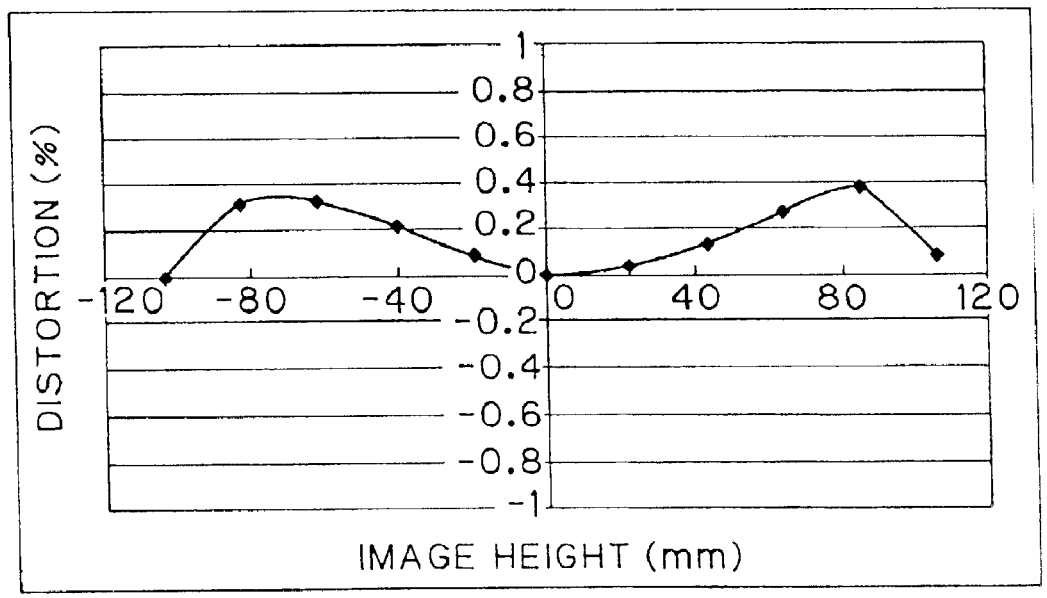
FIG. 10 is a diagram showing the distortion observed on the scanned region in the laser scanning apparatus of the second embodiment.

FIG. 9 shows the curvature of field observed in the vicinity of the scanned region, and FIG. 10 shows the distortion observed. Directing a gently divergent beam with respect to the main scanning direction, instead of a parallel beam, to the scanning optical system is effective in correcting distortion.

Figure 11:
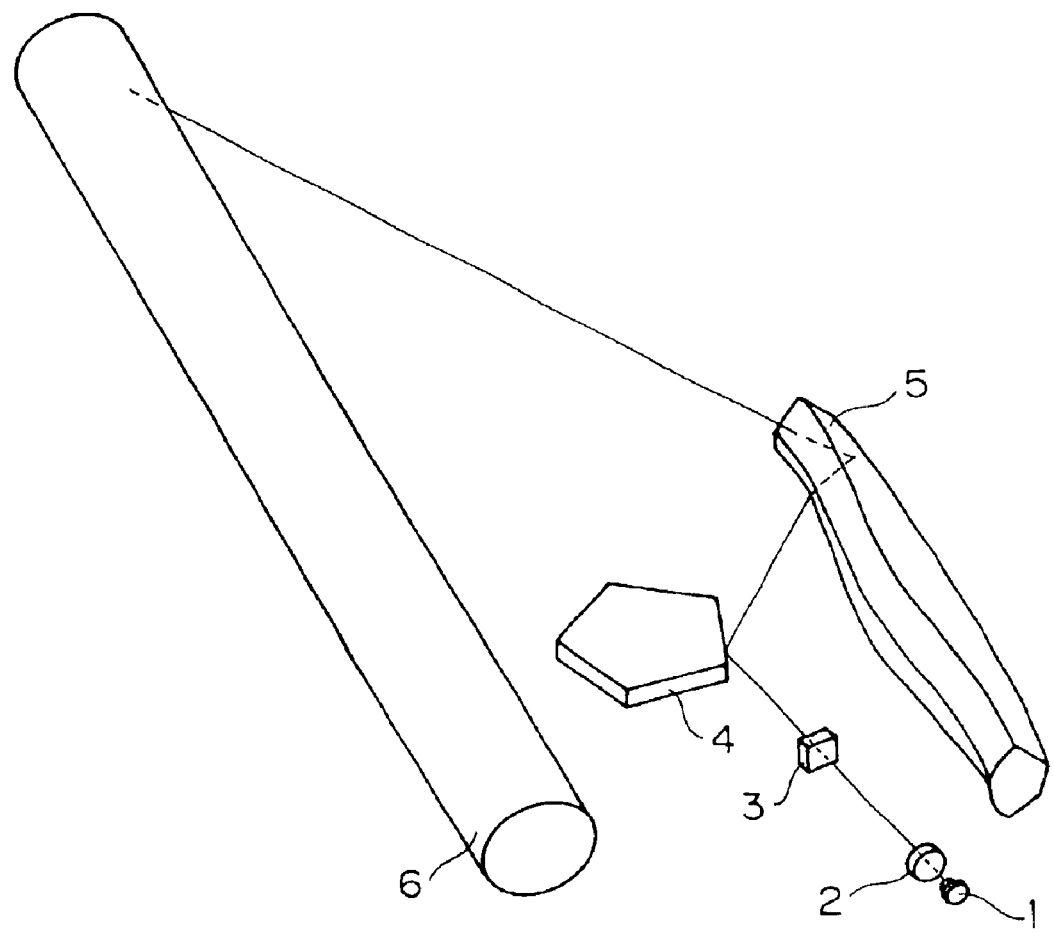
FIG. 11 is a perspective view showing the optical construction of the laser scanning apparatus of a third embodiment of the invention.

FIG. 11 shows the optical construction of the laser scanning apparatus 30 of a third embodiment of the invention. In the laser scanning apparatus 30, the transmissive surface of the back-surface-reflection mirror 5 is divided into two regions with respect to the sub scanning direction, and these two regions are designed independently of each other. In other respects, the construction here is largely the same as that of the laser scanning apparatus 10.

Figure 12:
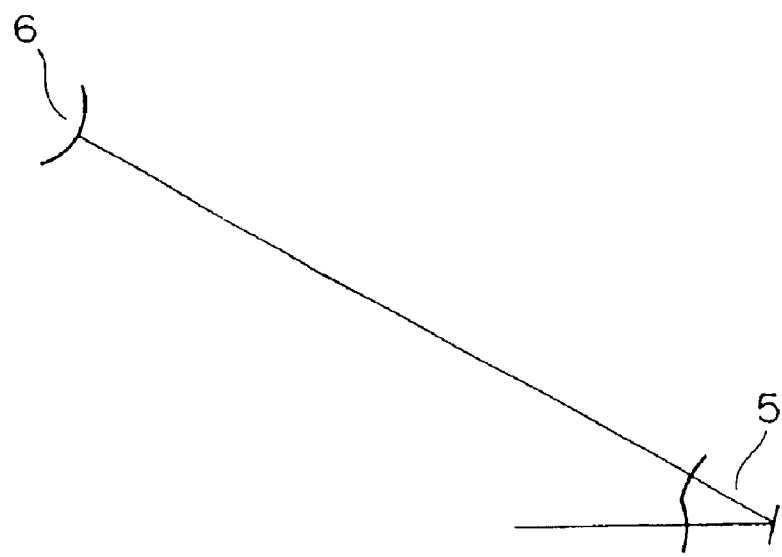
FIG. 12 is a sectional view taken along the sub scanning direction, showing the shape of the optical surface of the post-deflector optical system and how the laser light travels when deflected at an angle of deflection of 0° in the laser scanning apparatus of the third embodiment.

FIG. 12 shows the shape of the optical surface of the post-deflector optical system on a section thereof (y=0) along the sub scanning direction and how the laser light travels when deflected at an angle of deflection of 0°. Tables 7 to 9 show the construction data of the post-deflector optical system. All lengths are given in mm. The back-surface-reflection mirror 5 is made of resin, and has a refractive index of 1.51882. The shape of a surface is given by formula (1) noted earlier.

The transmissive surface of the back-surface-reflection mirror 5 is divided along the center line (z=0) thereof with respect to the sub scanning direction (see Table 8). Thus, the coefficients that define the surface differ between in the region where z<0 and in the region where z>0. At z=0, the shapes defined by the coefficients for the two different regions coincide, so that there are no abrupt elevations on the reflective surface. The inclination of the surface with respect to the sub scanning direction, however, is discontinuous across the line z=0.

Figure 13:
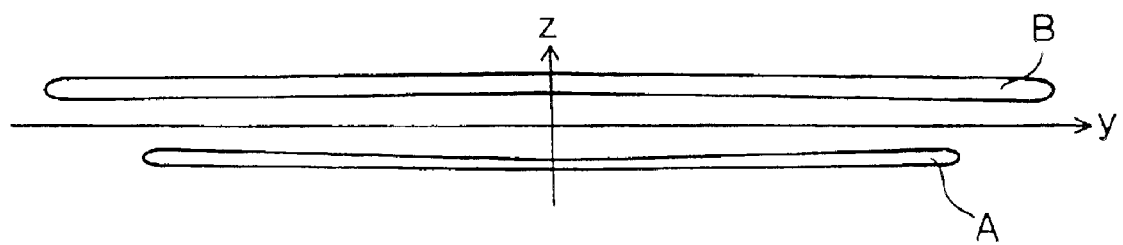
FIG. 13 is a diagram showing the areas on the transmissive surface of the back-surface-reflection mirror in which the laser light is incident in the laser scanning apparatus of the third embodiment.

FIG. 13 shows the area on the transmissive surface of the back-surface-reflection mirror 5 in which the laser light from the polygon mirror 4 is directly incident and the area thereon in which the laser light from the reflective surface is incident. In the laser scanning apparatus 30 also, the area A in which the laser light from the polygon mirror 4 is incident and the area B in which the laser light from the reflective surface is incident are separate from each other. Moreover, the area A in which the laser light from the polygon mirror 4 is incident is located within the region in which z<0, and the area B in which the laser light from the reflective surface is incident is located within the region in which z>0.

In this way, the transmissive surface is divided into two regions, and the region including the area A in which the laser light from the polygon mirror 4 is incident and the region including the area B in which the laser light from the reflective surface is incident are formed as independent surfaces. This increases freedom in design, and makes it possible to more finely control the convergence of the laser light on the scanned region.

Figure 14:
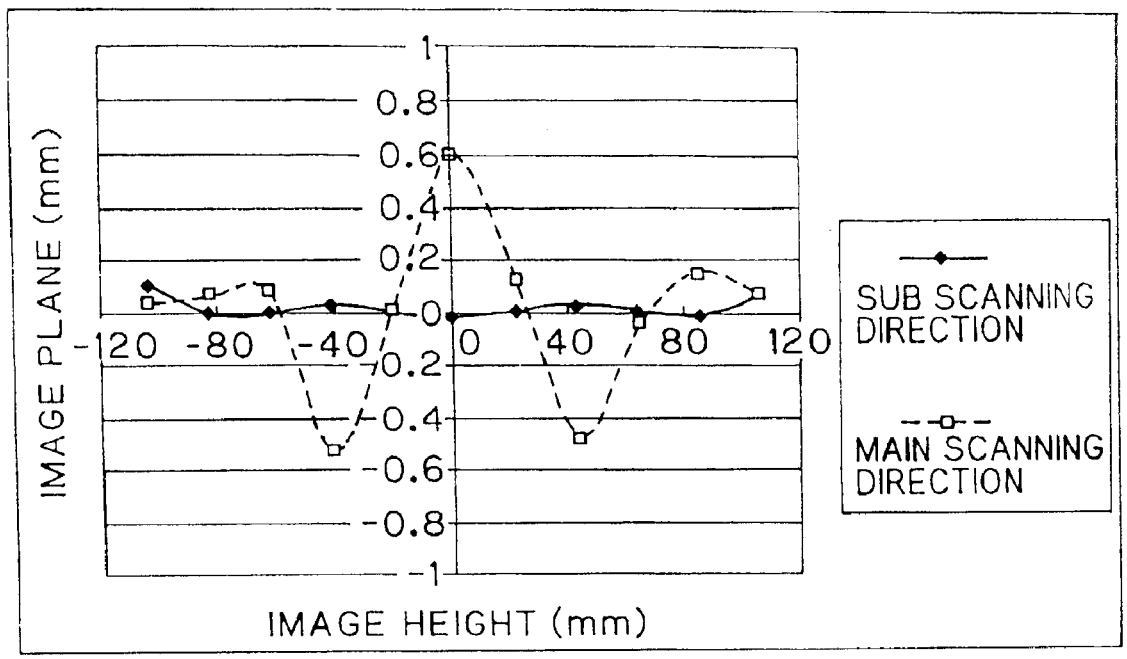
FIG. 14 is a diagram showing the curvature of field observed in the vicinity of the scanned region in the laser scanning apparatus of the third embodiment.
Figure 15:
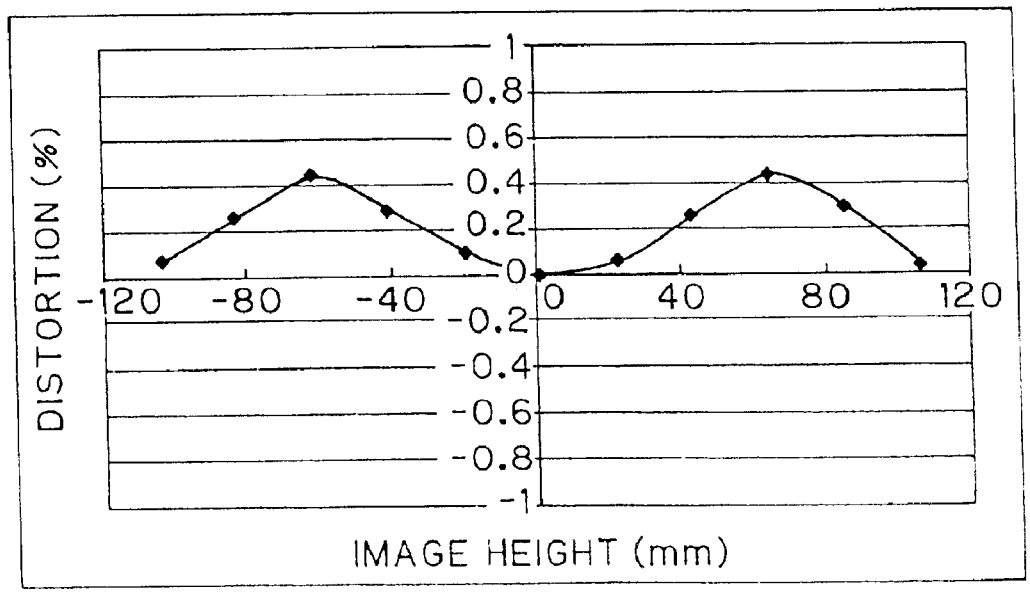
FIG. 15 is a diagram showing the distortion observed on the scanned region in the laser scanning apparatus of the third embodiment.

FIG. 14 shows the curvature of field observed in the vicinity of the scanned region, and FIG. 15 shows the distortion observed.

Figure 16:
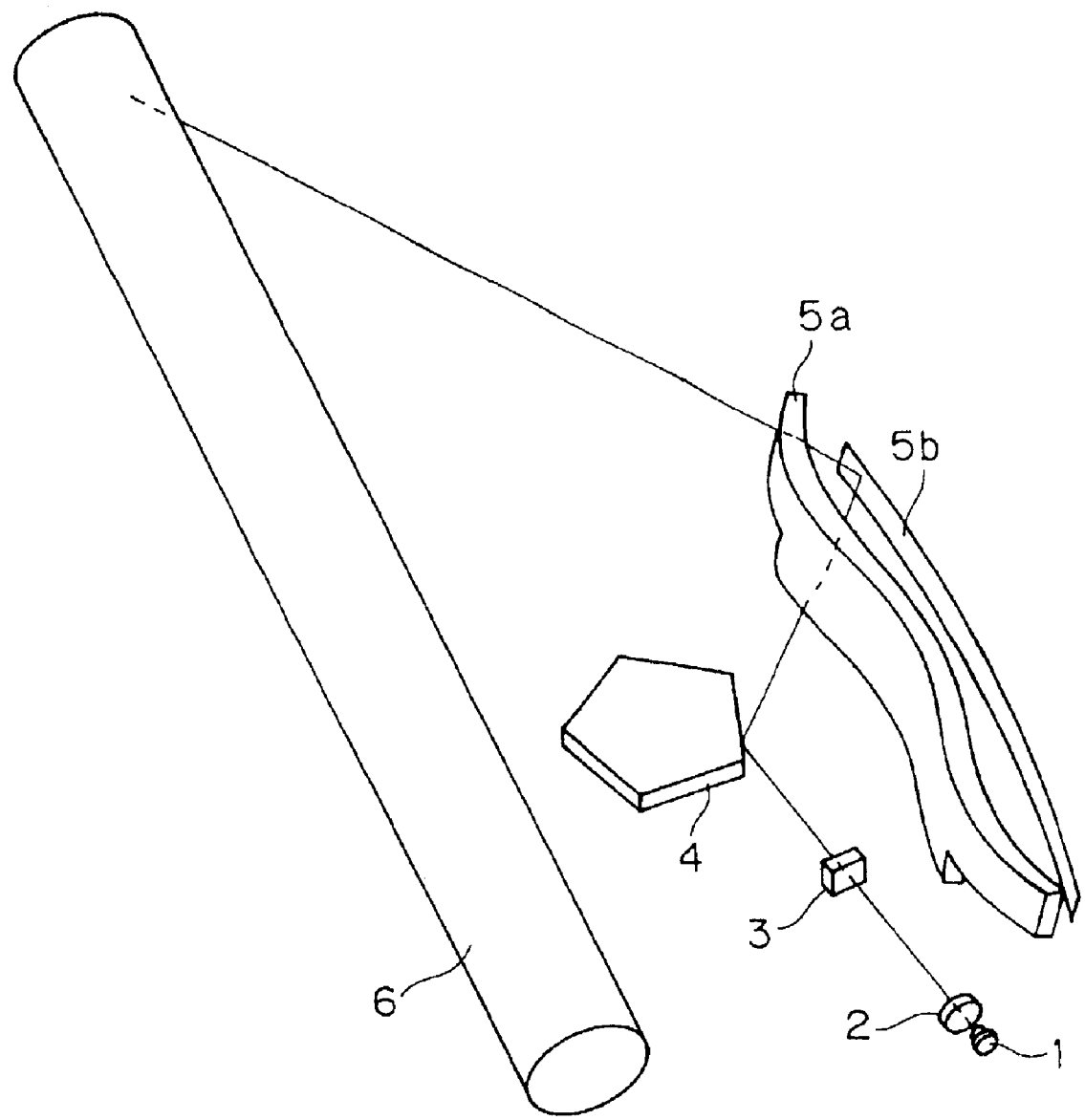
FIG. 16 is a perspective view showing the optical construction of the laser scanning apparatus of a fourth embodiment of the invention.

FIG. 16 shows the optical construction of the laser scanning apparatus 40 of a fourth embodiment of the invention. The laser scanning apparatus 40 is provided with a lens 5a and a mirror 5b in place of the back-surface-reflection mirror 5. In other respects, the construction here is largely the same as that of the laser scanning apparatus 10.

Figure 17:
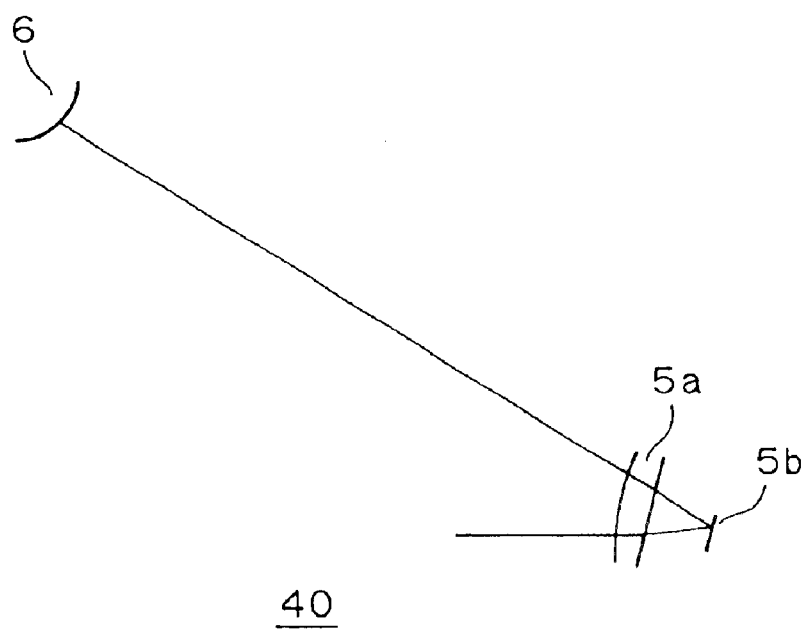
FIG. 17 is a sectional view taken along the sub scanning direction, showing the shape of the optical surface of the post-deflector optical system and how the laser light travels when deflected at an angle of deflection of 0° in the laser scanning apparatus of the fourth embodiment.

FIG. 17 shows the shape of the optical surface of the post-deflector optical system on a section thereof (y=0) along the sub scanning direction and how the laser light travels when deflected at an angle of deflection of 0°. Tables 10 to 13 show the construction data of the post-deflector optical system. All lengths are given in mm. The lens 5a is made of resin, and has a refractive index of 1.51882. The shape of a surface is given by formula (1) noted earlier.

The polygon mirror 4 side surface of the lens 5a is a free-form surface that is asymmetric with respect to both the main and sub scanning directions. The mirror 5b side surface of the lens 5a is, with respect to the main scanning direction, a symmetric free-form surface and, with respect to the sub scanning direction, a flat surface. The mirror 5b has a free-form surface that is asymmetric with respect to both the main and sub scanning directions.

Figure 18:
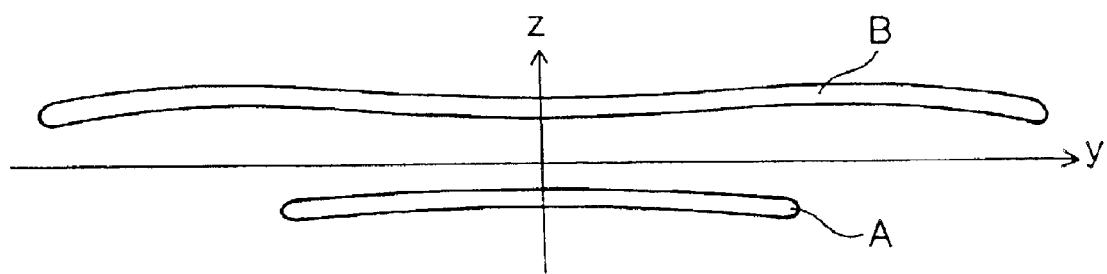
FIG. 18 is a diagram showing the areas on the transmissive surface of the back-surface-reflection mirror in which the laser light is incident in the laser scanning apparatus of the fourth embodiment.
Figure 19:
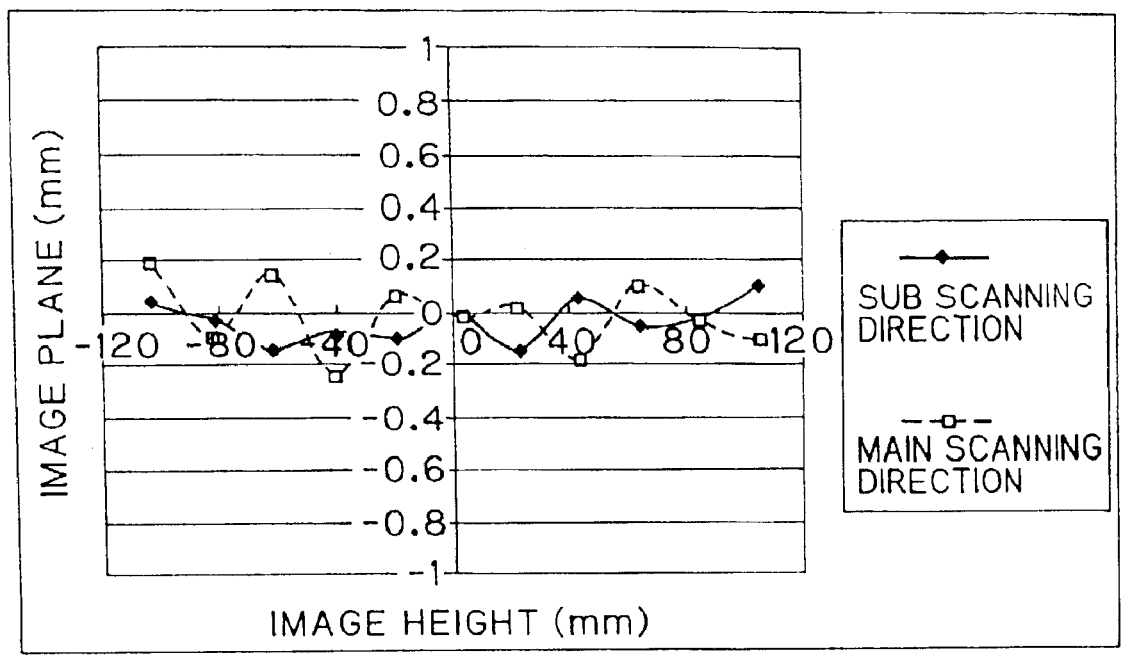
FIG. 19 is a diagram showing the curvature of field observed in the vicinity of the scanned region in the laser scanning apparatus of the fourth embodiment.
Figure 20:
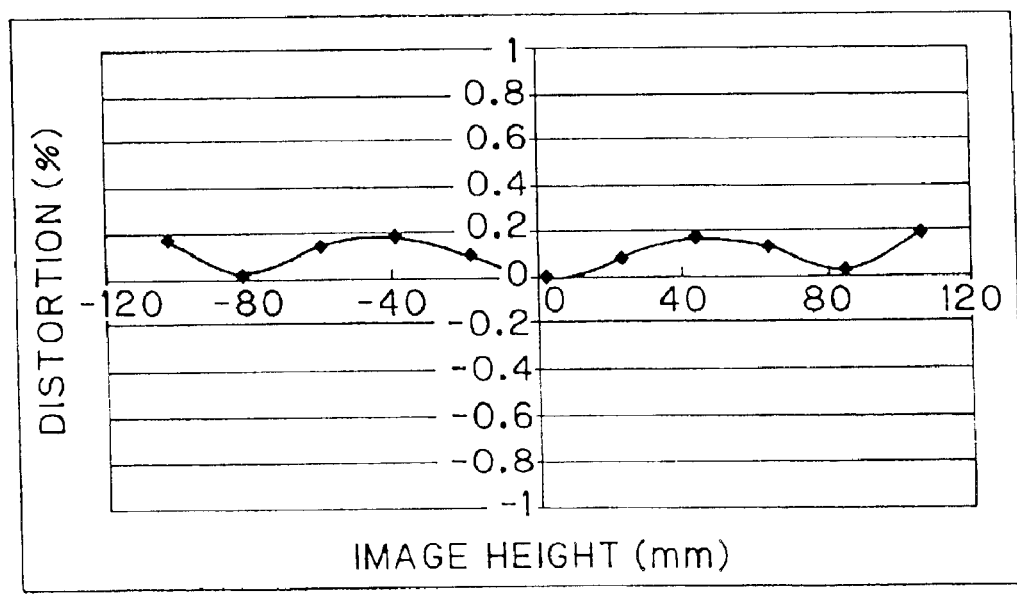
FIG. 20 is a diagram showing the distortion observed on the scanned region in the laser scanning apparatus of the fourth embodiment.

FIG. 18 shows the area on the polygon mirror 4 side surface of the lens 5a in which the laser light from the polygon mirror 4 is directly incident and the area thereon in which the laser light from the mirror 5b is incident. FIG. 19 shows the curvature of field observed in the vicinity of the scanned region, and FIG. 20 shows the distortion observed.

In the laser scanning apparatus 40, there are more surfaces whose optical powers act on the laser light than in the laser scanning apparatuses 10, 20, and 30. This makes it possible to more finely control the convergence of the laser light on the scanned region. This effect can be enhanced by increasing the number of optical elements included in the scanning optical system. However, for the simplification of the optical system, it is preferable to use, as specifically described above, not more than two optical elements.

In the laser scanning apparatuses 10 to 40 of the embodiments described above, the laser light from the back-surface-reflection mirror 5 or the lens 5a is made incident directly on the scanned region. It is, however, also possible to provide a flat mirror in the post-deflector optical system to turn the optical path of the laser light leading to the scanned region.

Obviously, many modifications and variations of the present invention are possible in light of the above teachings. It is therefore to be understood that within the scope of the appended claims, the invention may be practiced other than as specifically described.

TABLE 1

Embodiment 1 / Overall Construction Data of the Post-Deflector Optical System

| Surface | | Local Coordinate System Origin | | | Local Coordinate System X-Axis Vector | | | Local Coordinate System Y-Axis Vector | | |
|---|---|---|---|---|---|---|---|---|---|---|
| No. | Name | x | y | z | x | y | z | x | y | z |
| 1 | Back-Surface- | 25.51 | 0.00 | 3.88 | 0.9659 | 0 | −0.2588 | 0 | 1 | 0 |
| 2 | Reflection Mirror | 40.00 | 0.00 | 0.00 | 0.9659 | 0 | −0.2588 | 0 | 1 | 0 |
| 3 | | 25.51 | 0.00 | 3.88 | 0.9659 | 0 | −0.2588 | 0 | 1 | 0 |
| 4 | Evaluation Plane | −64.89 | 0 | 60.56 | −0.8660 | 0 | 0.5000 | 0 | 1 | 0 |

TABLE 2

Embodiment 1 / Surface Shape Data of Surfaces 1 and 3

| i\j | 0 | 1 | 2 | 3 | 4 |
|---|---|---|---|---|---|
| 0 | 0.00000E+00 | 0.00000E+00 | 3.57209E−03 | 6.36685E−04 | −7.99722E−05 |
| 1 | −7.35836E−03 | 4.93890E−04 | −9.39213E−05 | −4.10115E−06 | 1.74174E−06 |
| 2 | 1.50845E−03 | −2.95240E−04 | 1.76566E−05 | −1.46930E−06 | −8.05850E−08 |
| 3 | 3.43648E−06 | −7.57885E−07 | 7.40227E−08 | 2.19430E−09 | −1.20243E−09 |
| 4 | 1.02093E−06 | 1.82066E−07 | −1.15317E−08 | 1.14786E−09 | −8.46543E−11 |
| 5 | 7.57898E−10 | 2.85250E−10 | −5.33571E−11 | −1.69583E−12 | −1.53395E−13 |
| 6 | −6.00044E−10 | −3.49572E−11 | 1.16326E−12 | −7.33378E−13 | 4.52767E−15 |
| 7 | 9.06279E−13 | −9.77026E−14 | 2.04487E−14 | 1.16385E−15 | 1.91461E−16 |
| 8 | −4.53986E−14 | 1.06735E−14 | −8.97059E−17 | 3.01397E−16 | 6.89953E−17 |
| 9 | −3.57968E−16 | 2.49336E−17 | −2.78155E−18 | −3.22509E−19 | 1.88976E−20 |
| 10 | 2.54200E−17 | −2.62555E−18 | 1.98653E−19 | −9.22524E−20 | −9.93370E−21 |

| i\j | 5 | 6 | 7 | 8 |
|---|---|---|---|---|
| 0 | −1.54527E−05 | −6.43344E−07 | 4.26667E−07 | 6.15874E−08 |
| 1 | 2.61263E−08 | −1.66312E−08 | 1.77224E−10 | −2.88899E−10 |
| 2 | 3.02890E−08 | 5.62905E−09 | −4.89521E−10 | −9.26909E−11 |
| 3 | 3.02797E−10 | −9.81062E−12 | −6.80633E−12 | 2.14043E−13 |
| 4 | −2.15118E−11 | 2.83184E−12 | 3.73934E−13 | −2.58151E−14 |
| 5 | −4.39440E−14 | 3.83383E−14 | 2.72353E−15 | 4.14318E−16 |
| 6 | −1.40599E−14 | −2.10409E−15 | 2.58767E−16 | 5.19568E−17 |
| 7 | −1.69759E−16 | −2.21453E−18 | 2.93079E−18 | −9.21646E−19 |

TABLE 2-continued

Embodiment 1 / Surface Shape Data of Surfaces 1 and 3

| | | | | |
|---|---|---|---|---|
| 8 | −1.86594E−18 | −1.01092E−18 | 1.44561E−19 | 2.26900E−21 |
| 9 | 5.30453E−20 | −8.01877E−21 | −1.06211E−21 | 4.23338E−22 |
| 10 | 3.73085E−21 | −2.00817E−24 | −1.13226E−22 | 1.15312E−24 |

TABLE 3

Embodiment 1 / Surface Shape Data of Surface 2

| i\j | 0 | 1 | 2 | 3 |
|---|---|---|---|---|
| 0 | 0.00000E+00 | 0.00000E+00 | −5.44482E−03 | 1.69346E−05 |
| 1 | 0.00000E+00 | 6.48682E−05 | −8.16624E−06 | 1.68334E−06 |
| 2 | −8.28293E−04 | −7.29947E−05 | 4.91339E−06 | −1.30780E−07 |
| 3 | 1.92982E−07 | −5.92378E−08 | −6.38633E−09 | −8.50200E−11 |
| 4 | 5.65428E−07 | 1.63476E−08 | −2.82316E−09 | −4.65225E−10 |
| 5 | 1.48937E−09 | −5.32563E−11 | −1.84893E−12 | 1.35882E−13 |
| 6 | −3.60394E−10 | 1.74910E−11 | 2.44410E−13 | 3.33832E−13 |
| 7 | −2.51958E−13 | 2.04025E−14 | 5.69783E−15 | −2.54504E−16 |
| 8 | 3.79213E−14 | −5.45967E−15 | 1.83982E−16 | −8.34704E−17 |
| 9 | −3.29581E−17 | 6.23504E−19 | −1.54048E−18 | −3.18539E−20 |
| 10 | 1.69751E−18 | 2.92340E−19 | −3.38179E−21 | 1.46992E−21 |

TABLE 4

Embodiment 2 / Overall Construction Data of the Post-Deflector Optical System

| Surface | | Local Coordinate System Origin | | | Local Coordinate System X-Axis Vector | | | Local Coordinate System Y-Axis Vector | | |
|---|---|---|---|---|---|---|---|---|---|---|
| No. | Name | x | y | z | x | y | z | x | y | z |
| 1 | Back-Surface | 25.51 | 0.00 | 3.88 | 0.9659 | 0 | −0.2588 | 0 | 1 | 0 |
| 2 | Reflection Mirror | 40.00 | 0.00 | 0.00 | 0.9659 | 0 | −0.2588 | 0 | 1 | 0 |
| 3 | | 25.51 | 0.00 | 3.88 | 0.9659 | 0 | −0.2588 | 0 | 1 | 0 |
| 4 | Evaluation Plane | −72.17 | 0 | 64.76 | −0.8660 | 0 | 0.5000 | 0 | 1 | 0 |

TABLE 5

Embodiment 2 / Surface Shape Data of Surfaces 1 and 3

| i\j | 0 | 1 | 2 | 3 | 4 |
|---|---|---|---|---|---|
| 0 | 0.00000E+00 | 0.00000E+00 | 8.94917E−03 | 1.04481E−03 | −1.19042E−04 |
| 1 | −6.28755E−03 | 1.99641E−04 | −6.72560E−05 | −1.98692E−06 | 8.13716E−07 |
| 2 | 1.31002E−03 | −2.07360E−04 | 7.87416E−06 | −1.83860E−06 | −4.95200E−08 |
| 3 | 1.61723E−06 | −3.95830E−07 | 5.19706E−08 | −2.17307E−09 | −4.41115E−10 |
| 4 | 8.24672E−07 | 9.18213E−08 | −7.59848E−09 | 1.18555E−09 | −1.60268E−11 |
| 5 | 2.36621E−09 | 1.32590E−10 | −4.10232E−11 | −1.21709E−12 | 4.95256E−13 |
| 6 | −6.84311E−10 | −5.38968E−12 | 6.95491E−13 | −1.59185E−13 | −2.86091E−14 |
| 7 | 2.04646E−13 | −4.47839E−14 | 1.50078E−14 | 3.34088E−15 | −3.64098E−16 |
| 8 | 1.98362E−14 | 2.95702E−15 | 3.49376E−16 | −1.92637E−16 | 7.49981E−17 |
| 9 | −2.42373E−16 | 1.37596E−17 | −1.80103E−18 | −1.03237E−18 | 1.46672E−19 |
| 10 | 1.66762E−17 | −1.35403E−18 | 3.40452E−20 | 3.56603E−20 | −1.18464E−20 |

| i\j | 5 | 6 | 7 | 8 |
|---|---|---|---|---|
| 0 | −2.46583E−05 | −7.23779E−07 | 4.48785E−07 | 7.14750E−08 |
| 1 | −5.69033E−08 | 2.41429E−09 | 1.49227E−09 | −2.45707E−10 |
| 2 | 2.98439E−08 | 3.20739E−09 | −2.90507E−10 | −8.52749E−11 |
| 3 | 2.63451E−10 | −3.90474E−11 | −4.60849E−12 | 3.73250E−13 |
| 4 | −9.42835E−12 | 4.66805E−12 | 1.94802E−14 | 3.88354E−15 |
| 5 | −2.53836E−14 | 3.48737E−14 | −3.20832E−16 | −1.06416E−16 |
| 6 | −1.09041E−14 | −1.96432E−15 | 3.52625E−16 | −1.49429E−17 |
| 7 | −7.96420E−17 | 1.69432E−18 | 1.42047E−18 | −4.86533E−19 |

TABLE 5-continued

Embodiment 2 / Surface Shape Data of Surfaces 1 and 3

| | | | | |
|---|---|---|---|---|
| 8 | −7.31320E−18 | −6.59494E−19 | 8.88847E−20 | 1.06931E−20 |
| 9 | 1.59774E−20 | −7.39295E−21 | 3.63550E−23 | 3.00453E−22 |
| 10 | 3.63519E−21 | −3.45473E−22 | −4.70132E−23 | 1.36565E−23 |

TABLE 6

Embodiment 2 / Surface Shape Data of Surface 2

| i\j | 0 | 1 | 2 | 3 |
|---|---|---|---|---|
| 0 | 0.00000E+00 | 0.00000E+00 | −4.40735E−03 | −7.89330E−05 |
| 1 | 0.00000E+00 | −3.22105E−06 | −9.43841E−06 | 4.61269E−07 |
| 2 | −1.13543E−03 | −5.69906E−05 | 3.10688E−06 | 1.23896E−07 |
| 3 | −3.42921E−07 | −5.88662E−09 | 2.65026E−10 | −5.86915E−11 |
| 4 | 4.58430E−07 | 7.56264E−09 | −1.79096E−09 | −3.01500E−10 |
| 5 | 1.60143E−09 | −7.17166E−11 | −3.16472E−12 | 6.13161E−13 |
| 6 | −3.04864E−10 | 1.60208E−11 | 1.75418E−13 | 1.75489E−13 |
| 7 | −2.52955E−13 | 3.72997E−14 | 5.10057E−15 | 2.11737E−17 |
| 8 | 2.60768E−14 | −5.71069E−15 | 1.12609E−16 | −7.86912E−17 |
| 9 | −3.24843E−17 | −4.40736E−18 | −1.24283E−18 | −1.35671E−19 |
| 10 | 3.21228E−18 | 5.87920E−19 | 1.43581E−20 | 5.44592E−21 |

TABLE 7

Embodiment 3 / Overall Construction Data of the Post-Deflector Optical System

| Surface | | Local Coordinate System Origin | | | Local Coordinate System X-Axis Vector | | | Local Coordinate System Y-Axis Vector | | |
|---|---|---|---|---|---|---|---|---|---|---|
| No. | Name | x | y | z | x | y | z | x | y | z |
| 1 | Back-Surface- | 25.51 | 0.00 | 3.88 | 0.9659 | 0 | −0.2588 | 0 | 1 | 0 |
| 2 | Reflection Mirror | 40.00 | 0.00 | 0.00 | 0.9659 | 0 | −0.2588 | 0 | 1 | 0 |
| 3 | | 25.51 | 0.00 | 3.88 | 0.9659 | 0 | −0.2588 | 0 | 1 | 0 |
| 4 | Evaluation Plane | −66.53 | 0 | 61.50 | −0.8660 | 0 | 0.5000 | 0 | 1 | 0 |

TABLE 8

| i\j | 0 | 1 | 2 | 3 | 4 |
|---|---|---|---|---|---|
| Embodiment 3 / Surface Shape Data of Surfaces 1 and 3 (z < 0) | | | | | |
| 0 | 0.00000E+00 | −6.42249E−01 | −4.56150E−02 | 8.10893E−05 | −7.02908E−05 |
| 1 | −6.99583E−03 | 1.98596E−03 | 2.10849E−04 | 1.33139E−05 | 4.06633E−07 |
| 2 | 4.20826E−03 | −2.85409E−04 | −2.60812E−05 | −2.01142E−06 | 2.55584E−07 |
| 3 | 1.04031E−05 | −2.58997E−06 | −1.79633E−07 | 5.68659E−09 | 1.21206E−09 |
| 4 | −1.33036E−06 | 4.42600E−07 | 2.99596E−08 | 2.53171E−10 | −2.30941E−10 |
| 5 | −8.52637E−12 | 2.14993E−09 | −9.97606E−12 | −6.23795E−13 | 2.52877E−13 |
| 6 | −2.43163E−10 | −1.66147E−10 | 1.29522E−11 | −3.61440E−13 | −1.33719E−13 |
| 7 | −1.18353E−12 | −1.26320E−12 | 4.64734E−14 | 9.92372E−16 | −9.27034E−16 |
| 8 | 1.09696E−13 | 6.33520E−14 | −2.59015E−15 | 1.97949E−17 | 5.73689E−17 |
| 9 | 1.61232E−16 | 2.76474E−16 | −7.31329E−18 | −2.53413E−18 | 9.08310E−20 |
| 10 | −7.90363E−18 | −1.50489E−17 | −1.44427E−18 | 8.45512E−20 | 1.55993E−20 |
| Embodiment 3 / Surface Shape Data of Surfaces 1 and 3 (z ≥ 0) | | | | | |
| 0 | 0.00000E+00 | 5.11771E−02 | 2.55480E−02 | 3.68557E−04 | 7.42457E−06 |
| 1 | −6.99583E−03 | 2.83688E−04 | −1.45305E−05 | 1.47231E−06 | −4.73211E−08 |
| 2 | 4.20826E−03 | −2.25803E−05 | 5.42916E−06 | −6.73329E−07 | 3.38602E−08 |
| 3 | 1.04031E−05 | −2.61409E−07 | 2.73406E−08 | −2.39678E−10 | −1.68699E−10 |
| 4 | −1.33036E−06 | 5.36989E−08 | −7.20348E−09 | 6.76194E−10 | −1.49915E−11 |
| 5 | −8.52637E−12 | 2.53827E−10 | −2.23538E−11 | −2.91575E−12 | 4.15562E−13 |
| 6 | −2.43163E−10 | −2.68229E−11 | 3.05898E−12 | 5.47564E−14 | −3.44868E−14 |
| 7 | −1.18353E−12 | −1.32486E−13 | 6.77675E−15 | 2.31015E−15 | −2.68122E−16 |

TABLE 8-continued

| i\j | 0 | 1 | 2 | 3 | 4 |
|---|---|---|---|---|---|
| 8 | 1.09696E−13 | 7.12182E−15 | −1.30809E−16 | −2.46891E−16 | 3.06645E−17 |
| 9 | 1.61232E−16 | 2.10334E−17 | −6.37551E−19 | −4.82900E−19 | 5.20131E−20 |
| 10 | −7.90363E−18 | −7.31038E−19 | −1.15570E−19 | 6.27298E−20 | −6.53444E−21 |

TABLE 9

Embodiment 3 / Surface Shape Data of Surface 2

| i\j | 0 | 1 | 2 | 3 |
|---|---|---|---|---|
| 0 | 0.00000E+00 | 0.00000E+00 | −3.79215E−03 | 8.57618E−05 |
| 1 | 0.00000E+00 | 1.65129E−04 | 3.48474E−06 | 9.22540E−09 |
| 2 | 8.33534E−05 | −4.20874E−05 | 7.08350E−07 | −4.61199E−08 |
| 3 | 3.50311E−06 | −1.53563E−07 | −1.14153E−11 | −7.48047E−10 |
| 4 | −4.36704E−07 | 2.69417E−08 | −1.12676E−10 | −2.41867E−11 |
| 5 | −1.99576E−11 | 1.22763E−10 | −1.13469E−11 | 1.44571E−12 |
| 6 | −7.85577E−11 | −6.45608E−12 | 7.12532E−13 | −1.45319E−14 |
| 7 | −2.86974E−13 | −5.42596E−14 | 3.95931E−15 | −4.91251E−16 |
| 8 | 3.02068E−14 | −2.58110E−16 | 1.58786E−16 | −1.22177E−17 |
| 9 | 3.13892E−17 | 3.04398E−18 | 7.03836E−19 | 7.07494E−22 |
| 10 | −1.44750E−18 | 2.15199E−19 | −3.79500E−20 | 4.40200E−21 |

TABLE 10

Embodiment 4 / Overall Construction Data of the Post-Deflector Optical System

| Surface | | Local Coordinate System Origin | | | Local Coordinate System X-Axis Vector | | | Local Coordinate System Y-Axis Vector | | |
|---|---|---|---|---|---|---|---|---|---|---|
| No. | Name | x | y | z | x | y | z | x | y | z |
| 1 | Lens | 25.51 | 0.00 | 3.88 | 0.9659 | 0 | −0.2588 | 0 | 1 | 0 |
| 2 |  | 30.34 | 0.00 | 2.59 | 0.9659 | 0 | −0.2588 | 0 | 1 | 0 |
| 3 | Mirror | 40.00 | 0.00 | 0.00 | 0.9659 | 0 | −0.2588 | 0 | 1 | 0 |
| 4 | Lens | 30.34 | 0.00 | 2.59 | 0.9659 | 0 | −0.2588 | 0 | 1 | 0 |
| 5 |  | 25.51 | 0.00 | 3.88 | 0.96559 | 0 | −0.2588 | 0 | 1 | 0 |
| 6 | Evaluation Plane | −60.39 | 0 | 66.78 | −0.7071 | 0 | 0.7071 | 0 | 1 | 0 |

TABLE 11

Embodiment 4 / Surface Shape Data of Surfaces 1 and 5

| i\j | 0 | 1 | 2 | 3 | 4 |
|---|---|---|---|---|---|
| 0 | 0.00000E+00 | −5.95714E−02 | 1.60079E−02 | −9.45431E−04 | −3.27514E−05 |
| 1 | −7.92802E−03 | 7.55847E−04 | −4.35331E−05 | 3.16135E−06 | −9.46762E−08 |
| 2 | −9.67524E−03 | 5.47877E−06 | −1.23741E−05 | −9.85089E−07 | 1.92595E−07 |
| 3 | 4.98388E−06 | −1.00773E−06 | 2.83581E−08 | 3.82296E−09 | 5.67139E−10 |
| 4 | 4.07333E−06 | 1.00625E−07 | 2.63721E−09 | 3.29098E−10 | −1.02875E−10 |
| 5 | −3.18557E−09 | 1.03691E−09 | −6.89447E−11 | −1.34100E−12 | −2.71524E−13 |
| 6 | 1.42233E−10 | −1.00492E−10 | 1.00788E−12 | 7.40806E−14 | −2.10674E−15 |
| 7 | 1.08532E−12 | −4.17663E−13 | 3.28842E−14 | 3.88374E−16 | −5.82254E−18 |
| 8 | −2.05056E−13 | 2.81613E−14 | −2.93162E−16 | −1.12653E−17 | 9.41647E−20 |
| 9 | −9.83905E−17 | 3.64680E−17 | 3.76609E−19 | −4.02348E−19 | −2.60567E−20 |
| 10 | 2.56317E−17 | −2.22671E−18 | −8.36090E−20 | 8.49815E−21 | −1.58126E−21 |

| i\j | 5 | 6 | 7 | 8 |
|---|---|---|---|---|
| 0 | 1.42370E−05 | −9.53631E−08 | −9.45639E−08 | 3.84369E−09 |
| 1 | −2.24570E−08 | −1.51027E−09 | 2.10535E−10 | 6.81814E−13 |
| 2 | −5.51397E−09 | −2.69283E−10 | −2.88976E−11 | 3.47450E−12 |
| 3 | −9.88053E−11 | 5.49900E−12 | −2.73492E−13 | 1.43710E−14 |
| 4 | 7.59865E−12 | −1.26570E−12 | 1.84060E−13 | −8.44729E−15 |
| 5 | 3.98809E−14 | −6.74667E−15 | 1.40446E−15 | −8.62973E−17 |
| 6 | 1.05037E−15 | 1.03491E−15 | −1.38928E−16 | 3.80331E−18 |
| 7 | −2.35175E−18 | 3.84966E−18 | −8.70906E−19 | 5.05702E−20 |

TABLE 11-continued

Embodiment 4 / Surface Shape Data of Surfaces 1 and 5

| | | | | |
|---|---|---|---|---|
| 8 | −2.26875E−18 | 2.17560E−19 | −5.60383E−20 | 4.49895E−21 |
| 9 | −1.28398E−21 | 1.44974E−21 | −1.35744E−22 | 3.22385E−24 |
| 10 | 9.12472E−22 | −2.91386E−22 | 4.40107E−23 | −2.25811E−24 |

TABLE 12

Embodiment 4 / Surface Shape Data of Surfaces 2 and 4

| i\j | 0 |
|---|---|
| 2 | −1.00641E−02 |
| 4 | 4.10068E−06 |
| 6 | 1.87757E−10 |
| 8 | −2.41500E−13 |
| 10 | 2.63705E−17 |

TABLE 13

Embodiment 4 / Surface Shape Data of Surface 3

| i\j | 0 | 1 | 2 | 3 |
|---|---|---|---|---|
| 0 | 0.00000E+00 | 0.00000E+00 | −4.21583E−03 | 2.07864E−04 |
| 1 | 0.00000E+00 | 3.12286E−04 | −1.75871E−05 | −1.09360E−06 |
| 2 | −1.63147E−03 | −1.05252E−05 | 9.36450E−07 | −9.45273E−08 |
| 3 | 1.43779E−06 | −2.35808E−07 | 1.68618E−08 | 2.04385E−09 |
| 4 | −3.25867E−07 | 7.98578E−09 | 1.16266E−09 | −4.76061E−10 |
| 5 | −4.66859E−10 | 1.54398E−10 | −1.86464E−11 | −1.35872E−12 |
| 6 | 1.00803E−10 | −9.48287E−12 | 1.62813E−13 | 4.76820E−13 |
| 7 | −3.04919E−16 | −1.40667E−14 | 7.47264E−15 | −3.66139E−17 |
| 8 | −6.82030E−15 | 3.07996E−15 | −3.09107E−16 | −1.55344E−16 |
| 9 | 1.75678E−17 | −7.75400E−18 | 4.91017E−19 | −4.23798E−20 |
| 10 | −5.86861E−19 | −3.00046E−19 | 4.55824E−20 | 1.78633E−20 |

What is claimed is:

1. A laser scanning apparatus comprising:

a laser light source;

a deflector for deflecting laser light from the laser light source in a predetermined direction; and a scanning optical system for directing the laser light from the deflector to a predetermined scanned region so as to make the laser light converge on the scanned region, wherein the scanning optical system includes a first nonflat surface that transmits the laser light from the deflector and a second nonflat surface that reflects the laser light transmitted through the first surface toward the first surface, the second surface has no symmetry plane, and when the deflector deflects the laser light at least at such an angle of deflection that the laser light is incident at a center of the scanned region, the laser light transmitted through the first surface is incident on the second surface obliquely with respect to a direction perpendicular to a direction in which the deflector deflects the laser light.

2. A laser scanning apparatus as claimed in claim 1, wherein an area on the first surface in which the laser light from the deflector is incident does not overlap an area on the first surface in which the laser light from the second surface is incident.

3. A laser scanning apparatus as claimed in claim 1, wherein the first surface has no symmetry plane.

4. A laser scanning apparatus as claimed in claim 1, wherein, in a portion of the first surface between an area thereon in which the laser light from the deflector is incident and an area thereon in which the laser light from the second surface is incident, the first surface has discontinuous surface inclinations with respect to the direction perpendicular to the direction in which the deflector deflects the laser light.

5. A laser scanning apparatus as claimed in claim 1, wherein the first and second surfaces are formed on a single optical element.

6. A laser scanning apparatus comprising:

a laser light source;

a deflector for deflecting laser light from the laser light source in a predetermined direction; and an optical element having a first nonflat surface that transmits the laser light from the deflector and a second nonflat surface that has no symmetry plane and that reflects the laser light transmitted through the first surface toward the first surface.

7. A laser scanning apparatus as claimed in claim 6, wherein, when the deflector deflects the laser light at least at such an angle of deflection that the laser light is incident at a center of a scanned region, the laser light transmitted through the first surface is incident on the second surface obliquely with respect to a direction perpendicular to a direction in which the deflector deflects the laser light.

8. A laser scanning apparatus as claimed in claim 6, wherein an area on the first surface in which the laser light from the deflector is incident does not overlap an area on the first surface in which the laser light from the second surface is incident.

9. A laser scanning apparatus as claimed in claim 6, wherein the first surface has no symmetry plane.

10. A laser scanning apparatus as claimed in claim 6, wherein, in a portion of the first surface between an area thereon in which the laser light from the deflector is incident and an area thereon in which the laser light from the second surface is incident, the first surface has discontinuous surface inclinations with respect to the direction perpendicular to the direction in which the deflector deflects the laser light.

11. A laser scanning apparatus comprising:

a laser light source;

a deflector for deflecting laser light from the laser light source in a predetermined direction; and a scanning optical system for directing the laser light from the deflector to a predetermined scanned region so as to make the laser light converge on the scanned region, wherein the scanning optical system includes an optical element having a first nonflat surface that transmits the laser light from the deflector and a second nonflat surface that has no symmetry plane and that reflects the laser light transmitted through the first surface toward the first surface.

* * * * *